United States Patent [19]

Ludlow

[11] Patent Number: 5,265,958
[45] Date of Patent: Nov. 30, 1993

[54] TESTING DEVICE FOR THERMAL IMAGERS

[75] Inventor: John H. Ludlow, Worcestershire, England

[73] Assignee: The Secretary of State for Defence in Her Britannic Majesty's Government of the United Kingdom and Northern Ireland, London, United Kingdom

[21] Appl. No.: 834,221

[22] PCT Filed: Sep. 7, 1990

[86] PCT No.: PCT/GB90/01383

§ 371 Date: Feb. 14, 1992

§ 102(e) Date: Feb. 14, 1992

[87] PCT Pub. No.: WO91/04471

PCT Pub. Date: Apr. 4, 1991

[30] Foreign Application Priority Data

Sep. 12, 1989 [GB] United Kingdom ............ 8920614

[51] Int. Cl.⁵ .................. G01K 15/00; G01D 18/00
[52] U.S. Cl. ................................ 374/2; 250/495.1; 250/252.1
[58] Field of Search .............. 374/1, 2; 250/495.1, 250/504 R, 493.1, 252.1; 273/348.1

[56] References Cited

U.S. PATENT DOCUMENTS

| | | | |
|---|---|---|---|
| 3,227,879 | 1/1966 | Blau et al. | 250/84 |
| 3,283,148 | 11/1966 | Schwarz et al. | 250/252.1 |
| 3,478,211 | 11/1969 | Moser | 250/493.1 |
| 3,694,624 | 9/1972 | Buchta | 374/2 |
| 3,986,384 | 10/1976 | Giorgi | 374/2 |
| 4,058,734 | 11/1977 | Vroombout | 250/495.1 |
| 4,260,160 | 4/1981 | Ejnell et al. | 250/504 R |
| 4,263,515 | 4/1981 | Runciman | 250/494 |
| 4,378,489 | 3/1983 | Chabinsky et al. | 219/543 |
| 4,387,301 | 6/1983 | Wirick et al. | 250/252.1 |
| 4,422,646 | 12/1983 | Rosa | 250/495.1 |
| 4,524,386 | 6/1985 | Scott | 358/113 |
| 4,546,983 | 10/1985 | Rosa | 250/495.1 |
| 4,549,814 | 10/1985 | Creel et al. | 374/2 |
| 4,724,356 | 2/1988 | Daehler | 313/522 |
| 4,859,080 | 8/1989 | Titus et al. | 250/495.1 |
| 4,933,555 | 6/1990 | Smith | 250/252.1 |
| 4,965,448 | 10/1990 | Morse et al. | 250/252.1 |
| 5,023,459 | 6/1991 | Osborn et al. | 250/495.1 |
| 5,066,019 | 11/1991 | Dean et al. | 273/348.1 |
| 5,083,034 | 1/1992 | Frank et al. | 250/504 R |

FOREIGN PATENT DOCUMENTS

3827413 2/1990 Fed. Rep. of Germany ... 273/348.1

Primary Examiner—William A. Cuchlinski, Jr.
Assistant Examiner—Diego F. F. Gutierrez
Attorney, Agent, or Firm—Nixon & Vanderhye

[57] ABSTRACT

A thermal imager testing device (10) incorporates a pattern plate (32) with patterns (P0, P1, P2 and P3) cut through it. Patterns (P0 and P1) are of like spatial frequency, whereas patterns (P2 and P3) have respective relatively higher spatial frequencies. The patterns (P0 to P3) are like structured and like oriented, and they underlie blackbodies (34, 26, 28 and 30) respectively. Temperature differentials between the blackbodies (34 and 26 to 30) are maintained at constant values by temperature control circuits. The temperature of blackbody (34) is adjustable. The pattern plate (32) and underlying blackbodies are viewed by a thermal imager under test. The temperature of the blackbody (34) is adjusted until pattern (P0) is just discernable as cold relative to the pattern plate (32). If the thermal imager performance is acceptable patterns (P1 to P3) are then just discernable as hot relative to the pattern plate (32).

18 Claims, 7 Drawing Sheets

TESTING DEVICE FOR THERMAL IMAGERS

BACKGROUND OF THE INVENTION

1. Field of the Invention

This invention relates to a testing device for thermal imagers and a method of testing thermal images.

2. Discussion of Prior Art

Thermal imagers test methods and apparatus are well known in the prior art. They generally require access to temperature controlled, substantially draught free environments in special purpose laboratories. They can be used to test imagers for minimum resolvable temperature difference (MRTD) or minimum detectable temperature difference (MDTD).

A typical prior art testing apparatus incorporates a set of pattern plates, usually five or more, for viewing by a thermal imager. Each plate has a respective pattern, and the patterns differ in spatial frequency. In use the plates are positioned one at a time in front of a heating/cooling element consisting of a high emissivity plate connected to a heating/cooling device, usually a peltier device. Such high emissivity plates are usually referred to as blackbodies, although strictly speaking their emissivities are slightly less than unity. The heating/cooling element is viewed through the pattern plate firstly when hot and secondly when cold relative to ambient temperature. The temperatures are adjusted manually.

Each plate is thus viewed twice and the test is time consuming. A curve of MRTD or MDTD versus spatial frequency is obtained, but the test does not provide a quick assessment of whether the thermal imager passes or fails. The most limiting factor however is the necessity to perform the test in a temperature controlled, substantially draught free laboratory environment. In addition the prior art method requires expensive apparatus, including the use of a radiometer to calibrate the system prior to use. There is no apparatus or method available in the prior art to enable realistic tests to be carried out in the field.

SUMMARY OF THE INVENTION

It is an object of the present invention to provide an alternative device and method for testing thermal imagers. The present invention provides a testing device for thermal imagers including a viewing element characterised in that:

(a) the viewing element has first and second thermal emission regions with respective patterns of like spatial frequency, and (b) the device also includes control means for varying the effective temperatures of the first and second emission regions such that they are observable as above and below a background temperature respectively when viewed by a thermal imager.

The invention provides the advantage that it enables a rapid assessment of thermal imager performance to be made, by observation of two or more patterns. Where appropriate the patterns may be viewed simultaneously. Alternatively the patterns may be viewed in rapid succession, each being positioned automatically in the field of view as required. It is susceptible to construction with reduced size and cost compared to the prior art, and it does not require to be used in a temperature controlled, substantially draught free laboratory environment.

In a preferred embodiment additional thermal emission regions are provided on the viewing element in order to test the imager performance over a range of spatial frequencies and associated temperature differences.

The invention may be constructed with fixed temperature differentials between the first and further thermal emission regions. This enables GO-NOGO tests of thermal imager performance to be carried out very simply and rapidly.

The invention may also include circuitry for increasing the temperature differentials by a prearranged percentage. This enables a second less rigorous test to be conducted to assess whether imagers are part functional or non-functional.

The invention may include means by which the effective temperature of each thermal emission region may be manually adjusted. This enables full MRTD or MDTD tests to be carried out more rapidly than in the prior art.

The viewing element may be a pattern plate through which patterns are cut to define the thermal emission regions. The effective temperatures of the patterns may be provided by thermally emissive elements viewable through the patterns.

The invention may be constructed such that a first thermally emissive element forms part of a main plate upon which further thermally emissive elements are mounted and with respect to which the temperatures of the further elements are controlled. This provides for a device with a relatively high level of thermal stability thus easing its use in unstable environments.

The thermal emission regions are preferably like structured and like oriented. This enables tests to be performed on imagers with resolution varying with orientation.

The invention may be mounted within a container to improve thermal stability. In this embodiment the device is arranged at a focal plane of thermal focusing means through which the device may be viewed.

In an alternative aspect the invention provides a method of testing a thermal imager including arranging the imager to receive radiation, characterised in that:

(a) the radiation is emitted by first and second thermal emission regions which are both patterned to exhibit like spatial frequency, and (b) the method involves adjusting the effective temperatures of the first and second thermal emission regions so that they are discernable with mutually opposite contrast relative to a common background temperature.

The invention provides the advantage that the method is much simpler than the prior art thus much reducing the time taken to perform a test. A second advantage is the ability to use the method outside of a temperature controlled, substantially draught free, laboratory environment, making effective field tests possible.

The method may include arranging the thermal imager to receive radiation from several thermal emission regions simultaneously. This provides for the assessment of imager performance to be extended over a large range of spatial frequencies and corresponding temperature differentials. The additional thermal emission regions preferably have spatial frequencies greater than that of the first and second regions.

The method may include the manual adjustment of the effective temperature of the first thermal emission region, the effective temperatures of further emission regions being fixed relative to that of the first. This enables GO-NOGO tests of thermal imager performance to be completed rapidly.

The method may include the independent adjustment of the effective temperature of each thermal emission region. This enables full MRTD or MDTD tests to be carried out more rapidly than is possible in the prior art.

The method may include the observation of patterns which are all like structured and like oriented.

BRIEF DESCRIPTION OF THE DRAWINGS

In order that the invention may be more fully understood, embodiments thereof will now be described, by way of example only, with reference to the accompanying drawings in which.

DETAILED DISCUSSION OF PREFERRED EMBODIMENTS

Figure 1:
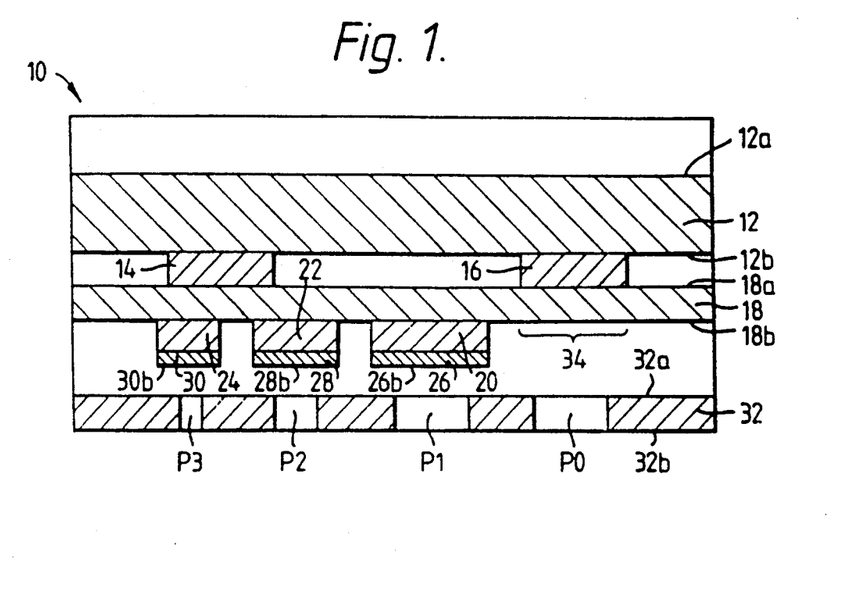
FIG. 1 is a schematic drawing of a thermal imager test device of the invention

Referring to FIG. 1 a section through a thermal imager test device 10 of the invention is shown schematically. The thermal imager test device 10 includes the following components; a heatsink 12, main plate Peltier heater-cooler devices (Peltiers) 14 and 16, a main plate 18, blackbody Peltiers 20, 22 and 24, small subsidiary blackbody plates 26, 28 and 30 and viewing element, in this case a pattern plate, 32.

Those components described as blackbodies are in fact approximations to true black bodies since an emissivity of unity is not achievable in practice. They are all manufactured from a thermally conducting material and coated to provide an emissivity of 0.95 or better. All the blackbody components have substantially the same emissivity.

The heatsink 12 is manufactured from 7 mm thick copper sheet and has cooling fins (not shown) fitted to one surface 12a. The heatsink 12 is manufactured from a thermally conductive material and has a large thermal capacity. Its temperature therefore varies comparatively slowly and is substantially even over its surface.

The Peltiers 14 and 16 are attached to a surface 18a of the main plate 18 and to a heatsink face 12b opposite the face 12a. They are thermoelectric devices used to control the temperature of the main plate 18, and thus they must be attached to both the heatsink 12 and main plate 18 in such a way as to provide a good thermal contact. In practice, more than two Peltiers may be required to ensure that the temperature of the main plate 18 is substantially constant over its surface, but for simplicity only two are shown. The Peltiers 14, 16 are controlled by a circuit to be described later.

The main plate 18 has a thermal emission face 18b opposite the face 18a. The plate 18 is a good thermal conductor of reasonable thickness which provides a substantially constant temperature over the face 18b. One small area 34 of the face 18b is used as a blackbody, and is therefore coated with a high emissivity paint.

The blackbody Peltiers 20, 22 and 24 are attached to the face 18b of the main plate 18. They are attached in such a way as to provide a good thermal contact. They are used to control the temperature of blackbodies 26, 28 and 30 in relation to the temperature of the main plate 18. Each Peltier 20, 22 and 24 is controlled by a respective circuit, to be described later.

The subsidiary blackbody plates 26, 28 and 30 are manufactured from 1.5 mm thick copper sheet. Each blackbody plate 26, 28 or 30 is attached to the corresponding Peltier in such a way as to provide good thermal contact. The plates 26 to 30 have respective lower surfaces 26b to 30b which are coplanar and which are coated to provide high emissivity. It is important that the respective temperatures be substantially constant over each of the faces 26b to 30b, that is within ±0.01° C. or ±0.5% whichever is the greater.

The pattern plate 32 is manufactured from aluminium sheet 1.5 mm thick. It is held in place, 2 mm below the coplanar surfaces 26b to 30b, on thermally insulating supports (not shown). The pattern plate 32 has upper and lower surfaces 32a and 32b. Surface 32a is reflective and surface 32b is coated to provide high emissivity.

Figure 2:
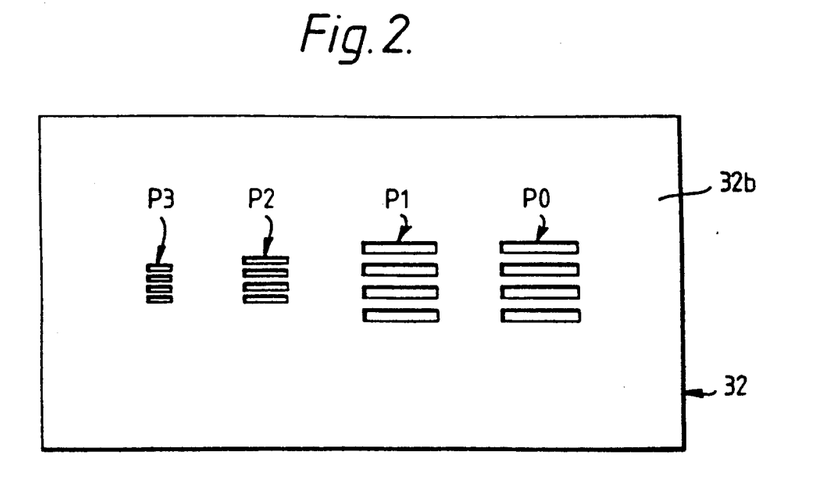
FIG. 2 is a plan view of a MRTD pattern plate incorporated in the FIG. 1 device.

Referring now also to FIG. 2, the lower surface 32b of the pattern plate 32 is shown schematically. The pattern plate 32 has four slotted patterns P0, P1, P2 and P3 cut through it. Each pattern is like structured (slotted) and like oriented (slot orientation). The pattern location with respect to the assembled device 10 provides for patterns P0 to P3 to underlie surfaces 34 and 26b to 30b respectively. Each of the blackbody plates 34 and 26 to 30 fills the field of view as seen through the corresponding one of patterns P0 to P3. The pattern plate lower surface 32b provides a test scene for viewing by a thermal imager under test. Each of the patterns P0 to P3 is a thermal emission region which has an effective temperature corresponding to the radiation passing through it. The effective temperature will vary slightly from the temperature of the respective blackbody underlying the pattern. The remaining area of the pattern plate 32 provides a background temperature.

Figure 3:
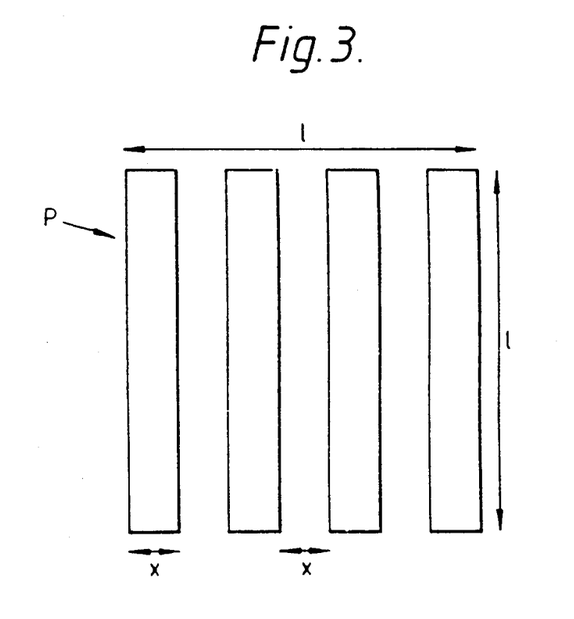
FIG. 3 is a schematic drawing of a general 4-slot pattern.

Referring now also to FIG. 3, a general pattern P is shown to scale. Each of the patterns P0 to P3 consists of four slots cut through the pattern plate 32, and is of the general form of pattern P. That is, each slot has a width x, and the separation between adjacent slots is also x. Thus the total width of the pattern is 7x. Each slot is a length L, where L=7x. Thus the overall dimensions of the pattern P are those of a square of side 7x. In this embodiment the following values of x are used; for P0 and P1 x=2.5 mm, for P2 x=1 mm and for P3 x=0.8 mm.

Figure 4:
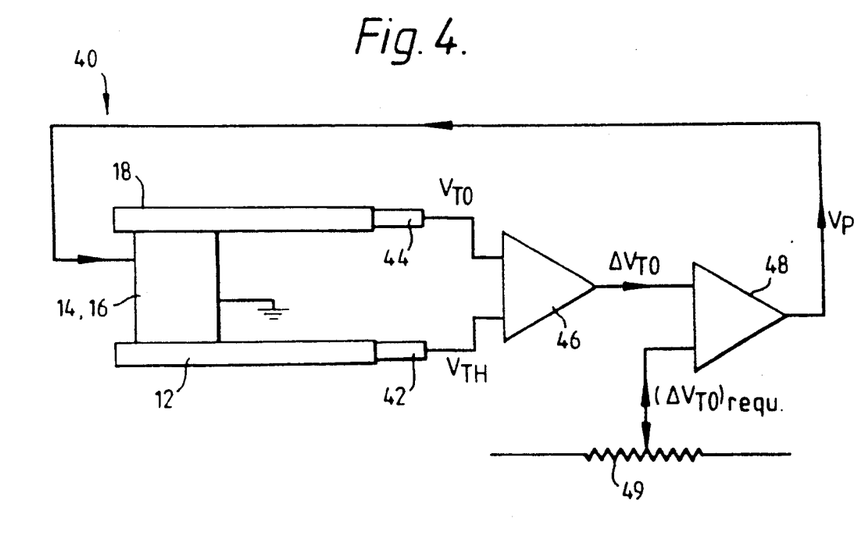
FIG. 4 schematically shows a circuit for controlling the temperature of a main plate component of the FIG. 1 device.

Referring now to FIG. 4, there is shown a temperature control circuit 40 in the form of a servo loop. The circuit 40 is employed to control the temperature of the main plate 18. Parts previously described are like referenced. It includes two thermocouples 42 and 44 attached to the heatsink 12 and main plate 18 respectively. The heatsink thermocouple 42 produces an output voltage $V_{TH}$ which corresponds to the temperature of the heatsink $T_H$. Similarly the main plate thermocouple 44 produces an output voltage $V_{T0}$ which corresponds to the temperature of the main plate $T_0$. The two output voltages $V_{TH}$ and $V_{T0}$ are input to a differential amplifier 46, the output voltage $\Delta V_{T0}$ from which corresponds to the temperature difference between the heatsink 12 and the main plate 18. The output $\Delta V_{T0}$ from the differential amplifier 46 is input to a second differential amplifier 48. A second input to the differential amplifier 48 is provided by a variable potentiometer 49 which is set to provide the required value of $\Delta V_{T0}$, $(\Delta V_{T0})_{requ}$. The differential amplifier 48 provides an output signal $V_P$ which is fed via a power amplifier (not shown) to Peltiers 14 and 16 in series. The amplifier 48 drives Peltiers 14 and 16 until its inputs $\Delta V_{T0}$ and $(\Delta V_{T0})_{requ}$ are equal, at which point its output $V_P$ is zero. The Peltiers 14 and 16 change from heating to cooling and vice versa when the amplifier output $V_P$ changes sign.

Figure 5:
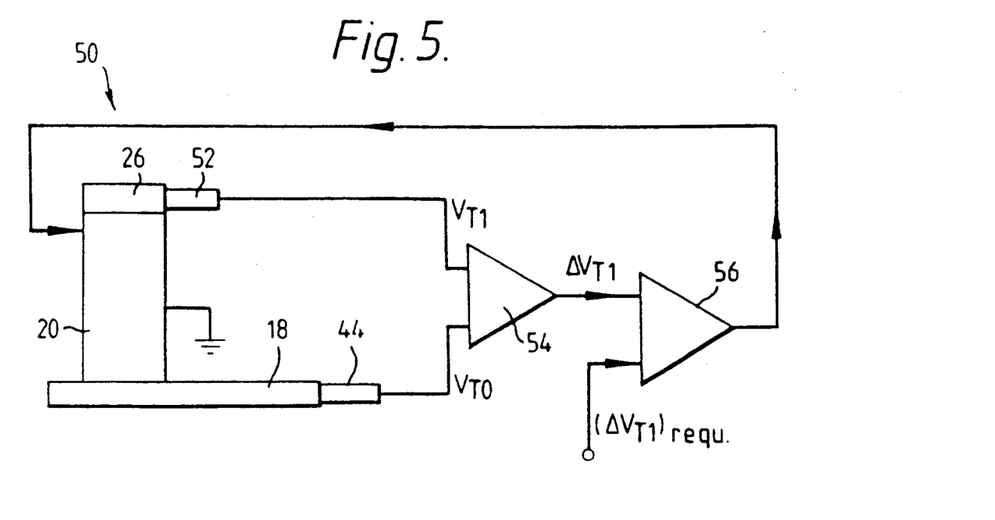
FIG. 5 schematically shows a circuit for controlling the temperature of a subsidiary component of the FIG. 1 device.

Referring now to FIG. 5, there is shown schematically a further temperature control circuit 50 for controlling the temperature of blackbody 26. Parts described earlier are like referenced. It incorporates a thermocouple 52 attached to the blackbody 26. The blackbody thermocouple 52 generates an output voltage $V_{T1}$ which corresponds to the temperature of the blackbody 26. The output voltage $V_{T1}$ is input to a differential amplifier 54. The amplifier 54 receives as a second input the voltage $V_{T0}$ of the main plate thermocouple 44. The amplifier 54 produces an output voltage $\Delta V_{T1}$ corresponding to the temperature difference $\Delta T_1$ between the main plate 18 and the blackbody 26. This output voltage $\Delta V_{T1}$ is input to a second differential amplifier 56. A second input to the amplifier 56 is provided at a preset level, that is the voltage $(\Delta V_{T1})_{requ}$. corresponding to the required temperature difference $(\Delta T_1)_{requ}$. The amplifier 56 provides an output which is fed, via a power amplifier (not shown), to Peltier 20. The current flowing in Peltier 20 causes a temperature change of blackbody 26 such that the desired temperature difference between the main plate 18 and blackbody 26 is approached.

Respective temperature control circuits similar to the circuit 50 are provided for blackbodies 28 and 30. For these circuits the preset values input to the second differential amplifiers are $(\Delta V_{T2})_{requ}$. and $(\Delta V_{T3})_{requ}$. respectively. The voltages correspond to temperature differences of $(\Delta T_2)_{requ}$. and $(\Delta T_3)_{requ}$. between blackbodies 28 and 30 and the main plate 18.

Ir the following description, which relates to the manner in which the invention is used, the "temperature of a pattern" is understood to mean the temperature of the blockbody viewed through the four slots of the pattern.

The temperature $T_0$ of the main plate 18 is set by adjustment of the potentiometer 49. The temperature control circuits 50 provide for the temperature of the blackbodies 26, 28 and 30, and thus of the patterns P1, P2 and P3, to be slaved to the temperature of the main plate 18. The temperature control circuits 40, 50 are set to provide;

a temperature at pattern P0 of $T_0$,
a temperature at pattern P1 of $T_0+\Delta T_1$,
a temperature at pattern P2 of $T_0+\Delta T_2$,
a temperature at pattern P3 of $T_0+\Delta T_3$.

When the circuit 40 is correctly adjusted by means of potentiometer 49, as will be described later, $T_0$ and $(T_0+\Delta T_1)$ are equi-spaced about the radiometric zero, R, that is;

$$R = \frac{T_0 + [T_0 + \Delta T_1]}{2} \quad (1)$$
$$= T_0 + \frac{\Delta T_1}{2}$$

The radiometric zero is the temperature of any pattern P which, when viewed through a thermal imaging device, is indistinguishable from the pattern plate 32. This occurs when the radiation passing out through the slots of the pattern P is equivalent to that from the pattern plate 32. The pattern plate temperature therefore provides a background temperature for the patterns P0 to P3.

The thermal resolution of a thermal imaging device is commonly defined in terms of a minimum resolvable temperature difference (MRTD) at a given spatial frequency. Or, more commonly, by a number of such values, since the MRTD is dependent on the spatial frequency. If the worst case MRTDs acceptable for a given thermal imaging system are defined as MRTD1 at the first spatial frequency (patterns P0 and P1), MRTD2 at the second spatial frequency (pattern P2) and MRTD3 at the third spatial frequency (pattern P3), then, from equation (1) it follows that:

$$MRTD1 = \frac{\Delta T_1}{2}.$$

In addition it follows that the preset temperature differences, when correctly set, correspond to;

$\Delta T_1 = MRTD1 + MRTD1$
$\Delta T_2 = MRTD1 + MRTD2$
$\Delta T_3 = MRTD1 + MRTD3$.

For this embodiment of the invention the following temperature differences are set;

$\Delta T_1 = 0.1°$ C.
$\Delta T_2 = 0.3°$ C.
$\Delta T_3 = 1.0°$ C.

Figure 12:
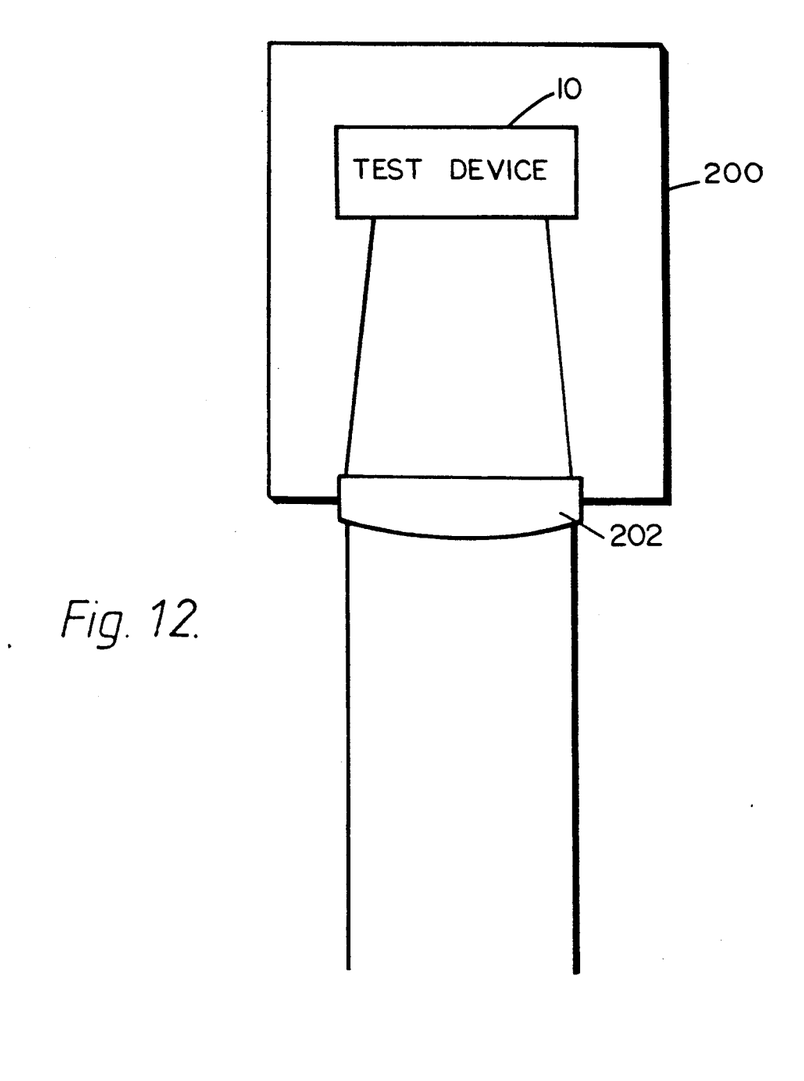
FIG. 12 is a schematic drawing of one embodiment of the present invention.

This embodiment of the invention is designed such that it is suitable for testing a thermal imager normally used for observing objects a few kilometers away. The thermal imager is focussed at infinity, and radiation from a thermal scene under observation is assumed to be parallel. The device 10 as shown in FIG. 12 is therefore located inside a protective container 200 with a germanium lens 202 of appropriate focal length, in this case 1.8 m, in front of the pattern plate 32. Thermal radiation passes from the test device 10, through the lens 202 and is substantially parallel when incident on an aperture of the thermal imager under test.

The device 10 is used in the following manner. The observer adjusts the potentiometer 49, and thus the temperature $T_0$ of the main plate 18 and the blackbody 34, until he/she can just distinguish pattern P0 as a cold four bar pattern. For a thermal imager showing hotter objects lighter than colder objects, as is normal, pattern P0 would show as four dark bars with respect to the background. P1 should then appear as four lighter bars with respect to the background, and should also just be discernable.

This provides for the radiometric zero to be correctly located. P2 and P3 should resemble P1 at higher spatial frequencies. The observer may then use whatever criteria have been set in order to determine whether or not the thermal imager has passed or failed the test. Such criteria may relate to percentage pattern area or number of bars resolvable.

An alternative embodiment of the invention includes an additional feature for use when a thermal imager fails the standard test. A switch is provided, with appropriate circuitry, such that when the switch is switched on all the preset temperature differences $\Delta T_1$, $\Delta T_2$ and $\Delta T_3$ are increased by 10%. The thermal imager is retested employing the device 10 at the adjusted temperatures. If the retest is successful the thermal imager may be used in the knowledge that it is working, but is not as sensitive as it should be, and mainteance can be arranged. If it fails the retest, then in most circumstances the imager should be repaired before use.

Figure 6:
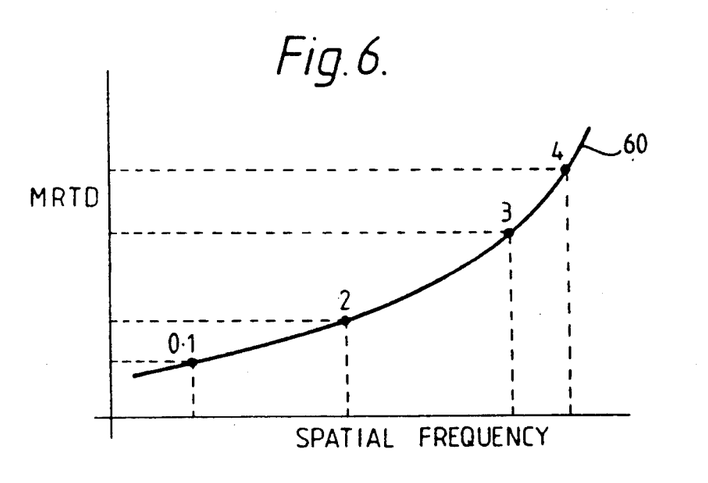
FIG. 6 is a graph of MRTD against target spatial frequency for a typical thermal imager.

As previously mentioned the MRTD is dependent on spatial frequency. Referring now to FIG. 6, an example of an MRTD versus spatial frequency curve 60 is shown graphically. The curve 60 is determined using the prior art test apparatus and equipment for any particular type of imager to be tested with the invention. It is then used to select appropriate spatial frequencies and temperature differences for use in the invention. The curve 60 shows that MRTD increases with increasing spatial frequency; i.e. finer scene features require greater temperature differences to allow their discernment.

Figure 7:
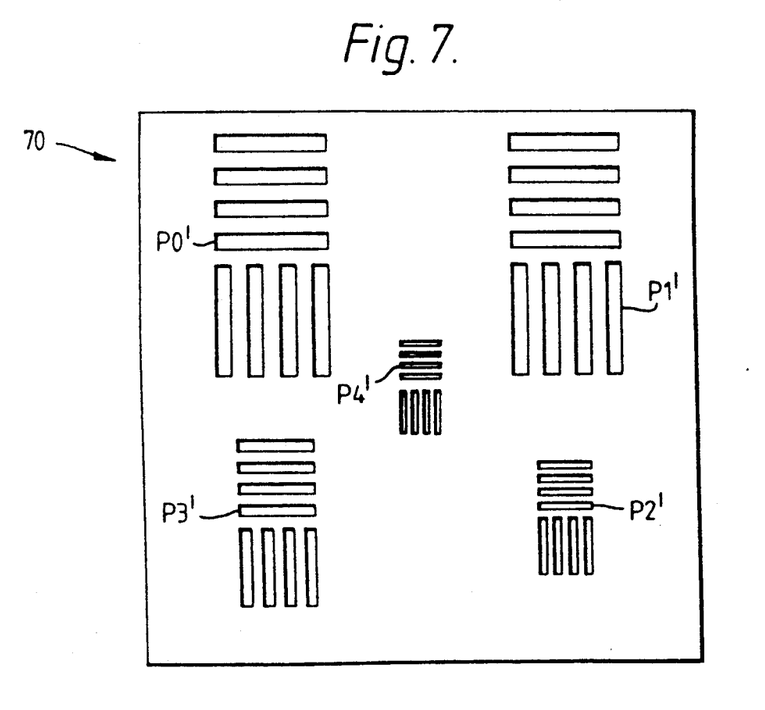
FIG. 7 is a plan view of an alternative MRTD pattern plate.

Referring now to FIG. 7, an alternative pattern plate 70 is shown to scale. Each four slot pattern is repeated both horizontally and vertically, thus enabling the resolution to be tested in two orthogonal directions at once. In addition the highest frequency pattern P4' is at the centre, since the resolution of the thermal imager can be expected to be best at the centre of the aperture.

The invention may be produced with any convenient number of patterns, of any design, in any position on the pattern plate. The minimum number of patterns is two of the same frequency. But, since this would only provide information about one point on the curve 60, this form of the invention would rarely be used in practice. The form of the pattern plate 70 is the preferred embodiment for many applications; it tests resolution in two orthogonal directions at each of four spatial frequencies. The test device 10 may be used to test for minimum detectable temperature difference (MDTD) in addition to MRTD.

Figure 8:
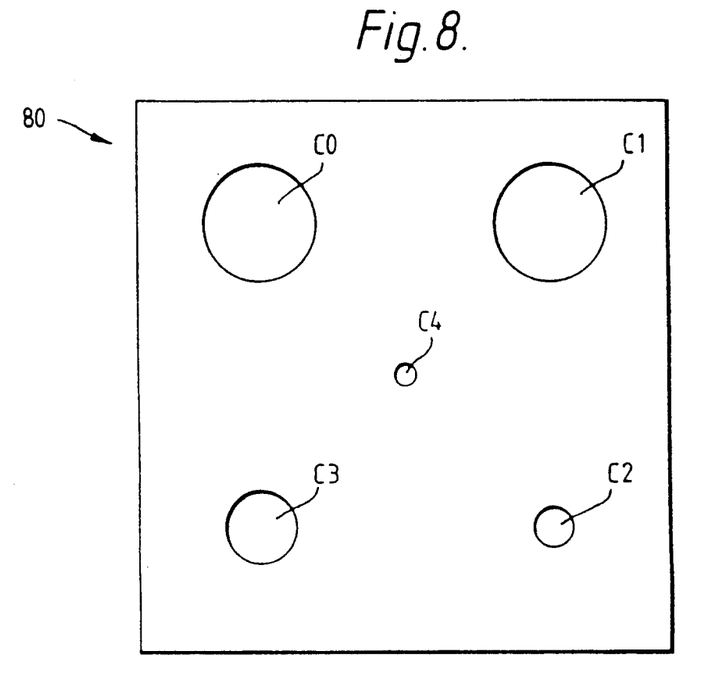
FIG. 8 is a plan view of a MDTD pattern plate.

Referring now to FIG. 8, a pattern plate 80 suitable for MDTD tests is shown to scale. The pattern plate 80 has a set of differently sized circular holes C0 and C1, C2, C3 and C4 cut through it in place of 4-slot patterns. The temperatures of the test device 10 would be selected as previously described for the patterns plates 32 and 70. The test would be carried out in a similar manner.

As previously stated the embodiment described above is suitable for use with an imager designed for observing objects a few kilometers away. In order to use the test device 10 with imagers of different ranges it may only be necessary to replace the germanium lens positioned in front of the pattern plate 32, 70, 80. Alternatively a different pattern plate with altered spatial frequencies may be employed. In addition the preset temperature differences are set appropriately.

The pattern plates 32, 70, 80 described thus far require the use of a very high quality substantially aberration free germanium lens. Such lenses are very expensive and would be a significant proportion of the cost of the whole device. If patterns are only viewed when positioned at the centre of a lens field of view then a poorer quality lens may be employed. Thus alternative embodiments (not illustrated) may be constructed in which a motor drive, or similar, is used to position the various patterns at the centre of the lens field of view in rapid succession. Each pattern is retained at the centre of the lens field of view for a short time, for instance one second. The operation of these embodiments is similar to that of equivalent embodiments with high quality lenses since there are no additional controls or adjustments to be made. The use of a poorer quality germanium lens may considerably reduce the cost of such embodiments, even allowing for the additional components required to move the patterns relative to the lens.

Figure 9:
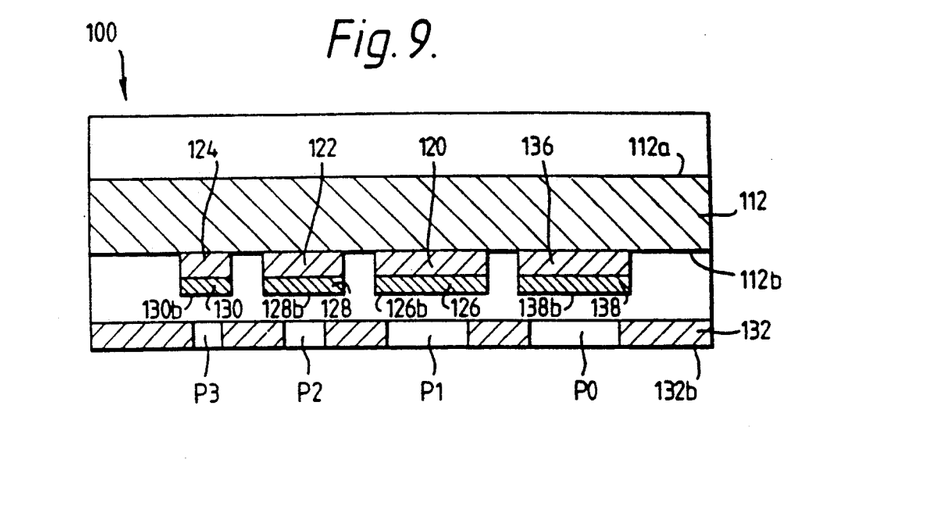
FIG. 9 is a schematic drawing of an alternative thermal imager test device of the invention.

Referring now to FIG. 9, a section through an alternative embodiment 100 of the invention is illustrated schematically. Parts common to the device 10 are like referenced with a prefix of one. The thermal imager test device 100 includes the following components; a heatsink 112, four Peltiers 136, 120, 122, 124, four blackbody plates 138, 126, 128, 130 and a pattern plate 132. The Peltiers 136, 120, 122, 124 are attached to a heatsink surface 112$b$, in such a way as to provide a good thermal contact. Each Peltier 136, 120, 122, 124, is controlled by a respective circuit to be described later. Each blackbody plate 138, 126, 128, 130 is attached to the corresponding Peltier 136, 120, 122, 124 in such a way as to provide a good thermal contact. The blackbody plates 138, 126, 128, 130 have respective lower surfaces 138$b$, 126$b$, 128$b$, 130$b$, which are coplanar and which are coated to provide high emissivity. The pattern plate 132 is identical to the pattern plate 32. It is held in place 2 mm below the coplanar surfaces 138$b$, 126$b$, 128$b$, 130$b$, on thermally insulating supports (not shown). The location of the pattern plate 132 provides for patterns P0 to P3 to underlie surfaces 138$b$, 126$b$, 128$b$, 130$b$ respectively.

Figure 10:
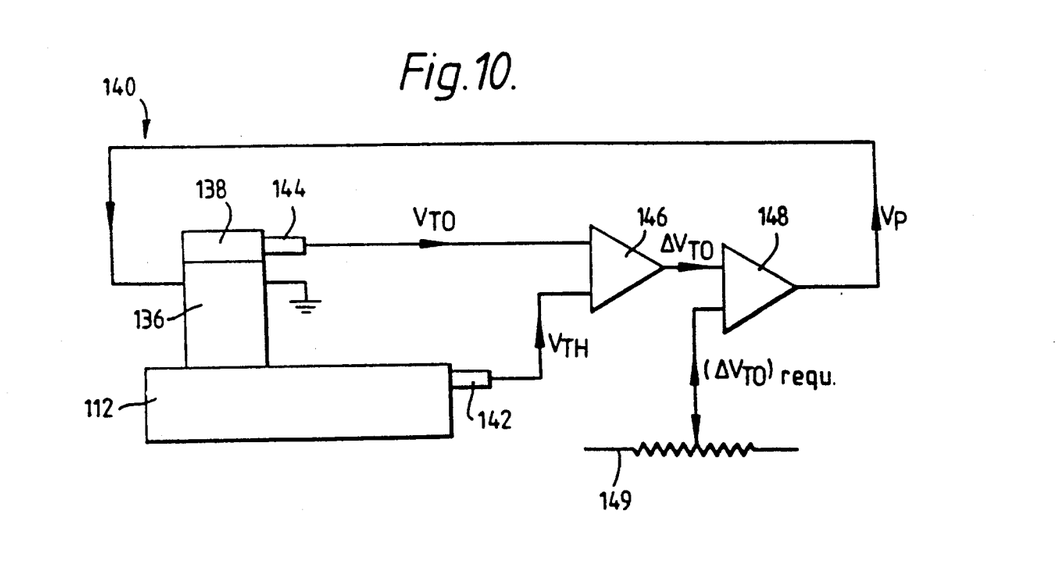
FIG. 10 schematically shows a circuit for controlling the temperature of a first blackbody component of the FIG. 9 device.

Referring now also to FIG. 10 a temperature control circuit 140, in the form of a servo loop, is shown schematically. Parts common to the device 100 are like referenced, and parts equivalent to those of the circuit 40 are like referenced with the addition of a prefix of one. Two thermocouples 142, 144 are attached to the heatsink 112 and blackbody plate 138 respectively. The thermocouple 142 produces an output voltage $V_{TH}$ corresponding to $T_H$, the temperature of the heatsink 112. Similarly the thermocouple 144 produces an output voltage $V_{T0}$ corresponding to $T_0$, the temperature of blackbody plate 138. The two voltages $V_{TH}$ and $V_{T0}$ are input to a differential amplifier 146. The amplifier 146 provides an output voltage $\Delta V_{T0}$ which corresponds to the temperature difference between the heatsink 112 and blackbody 138. The voltage $\Delta V_{T0}$ is input to a second differential amplifier 148. A second input to the amplifier 148 is provided by a variable potentiometer 149 which is set to provide the required value of $\Delta V_{T0}$, $(\Delta V_{T0})_{requ}$. The second amplifier 148 provides an output $V_p$ which is fed via a power amplifier (not shown) to the Peltier 136. The amplifier 148 drives the Peltier 136 until its inputs $\Delta V_{T0}$ and $(\Delta V_{T0})_{requ}$ are nearly equal and its output $V_p$ approaches zero. This arrangement is equivalent to the circuit 40 described earlier.

Figure 11:
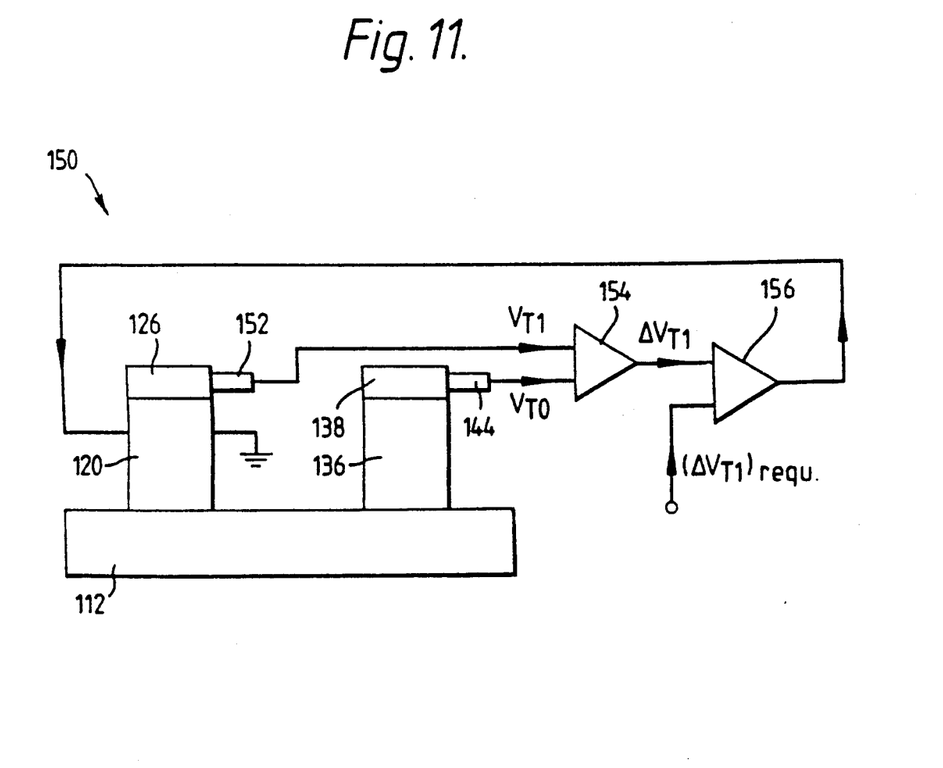
FIG. 11 schematically shows a circuit for controlling the temperature of a subsidiary component of the FIG. 9 device.

Referring now also to FIG. 11, a further temperature control circuit 150, for controlling the temperature of blackbody 126, is shown schematically. Parts common to the device 100 are like referenced, and parts equivalent to those of the circuit 50 are like referenced with a prefix of one. A thermocouple 152 is attached to blackbody 126 and generates an output voltage $V_{T1}$ corresponding to the temperature $T_1$ of the blackbody 126. The voltage $V_{T1}$ is input to a first differential amplifier 154. The voltage $V_{T0}$ of the blackbody 138 thermocouple 144 is also input to the amplifier 154. The amplifier 154 produces an output voltage $\Delta V_{T1}$ corresponding to the temperature difference $\Delta T_1$ between blackbodies 138 and 126. The output voltage $\Delta V_{T1}$ is input to a second differential amplifier 156. A second input to the amplifier 156 is provided at a preset level of $(\Delta V_{T1})_{requ.}$, corresponding to the required temperature difference $(\Delta T_1)_{requ.}$. The amplifier 156 provides an output which is fed, via a power amplifier (not shown) to the Peltier 120. The amplifier drives the Peltier 126 such that the desired temperature difference $\Delta T_1$ is achieved and maintained. This arrangement is equivalent to the circuit 50 previously described.

Respective temperature control circuits similar to the circuit 150 are provided for the blackbodies 128, 130. For these circuits the preset values input to the second differential amplifiers are $(\Delta V_{T2})_{requ.}$ and $(\Delta V_{T3})_{requ.}$ respectively. The voltages correspond to temperature differences of $(\Delta T_2)_{requ.}$ and $(\Delta T_3)_{requ.}$ between blackbodies 128, 130 and blackbody 138.

The device 100 is operated in the same manner as device 10 with blackbody 138 taking the place of the blackbody area 34 on the main plate 18. Due to the lack of an equivalent of the main plate 18, the temperature stability of the device 100 in an unstable environment is less than that of the device 10. This makes the device 100 less bulky, but somewhat more difficult to use due to reduction in thermal time constant. It also, however, results in lower power consumption thus enabling smaller battery packs to be used with portable embodiments.

Further embodiments (not illustrated) may be constructed for use in making full MRTD measurement (see e.g. FIG. 6) in addition to GO-NOGO tests. For MRTD measurements to be made the temperature of each subsidiary blackbody in a device relative to the temperature of the P0 blackbody must be manually adjustable. Thus a temperature control circuit of the kind illustrated in FIGS. 4 and 10 is necessary for each subsidiary blackbody. For each such circuit a first thermocouple is attached to the P0 blackbody and a second thermocouple is attached to the respective subsidiary blackbody. The temperature difference between the P0 blackbody and respective subsidiary blackbody may then be adjusted manually by means of a potentiometer, as described for circuits 40 and 140. The MRTD values obtained are then displayed on a series of digital displays.

Full MRTD measurements are carried out in the following manner. First the temperature of P0 is adjusted until the four slots may just be observed, cold relative to the pattern plate, according to the appropriate MRTD criterion. Next the temperature of P1 is adjusted until the four slots may just be observed, hot relative to the pattern plate, according to the appropriate MRTD criterion. Thus the two patterns P0 and P1 of like spatial frequency may be observed on opposite sides of the radiometric zero. If this is not now the case, the temperatures of either or both patterns P0 and P1 may be readjusted to obtain this position. The temperatures of further patterns are then adjusted in the same way until the patterns may be seen according to the appropriate MRTD criterion whilst keeping P0 and P1 equally visible. The temperature differences between the P0 blackbody and respective subsidiary blackbodies may be used to compute the MRTD values as described earlier. The MRTD values are then read from the series of digital displays.

I claim:

1. A testing device for thermal imagers, said device including:
   a viewing element having first and second thermal emission regions with respective patterns of like spatial frequency;
   a background surrounding said thermal emission regions and having a reference temperature against which said thermal emission regions are viewed by said thermal imager; and
   control means for varying the effective temperatures of the first and second thermal emission regions such that said emission regions are observable with mutually opposite contrast by a thermal imager under test as above and below said reference temperature, respectively.

2. A device according to claim 1, wherein:
   the control means includes for each thermal emission region a respective control element and means for adjusting the temperature of the respective control element, and
   each control element governs the effective temperature of the respective thermal emission region.

3. A device according to claim 2, wherein each of said means for adjusting the control element temperatures includes means for maintaining constant a temperature differential between the effective temperature of one of the thermal emission regions and that of an other thermal emission region.

4. A device according to claim 3, further including means for increasing the temperature differential.

5. A device according to claim 1, wherein said viewing element has additional thermal emission regions with effective temperatures governed by respective control means.

6. A device according to claim 1, wherein the thermal emission regions are viewable simultaneously.

7. A device according to claim 1, further including means for independent adjustment of the effective temperature of the thermal emission regions.

8. A device according to claim 1, wherein said viewing element is a pattern plate through which patterns are cut to define the thermal emission regions.

9. A device according to claim 8, further including thermally emissive elements viewable through said patterns and connected to respective temperature control devices.

10. A device according to claim 9, wherein said thermally emissive elements comprise a first such element upon which the other such elements are mounted and with respect to which the temperatures of the other such elements are controlled.

11. A device according to claim 1, wherein said thermal emission regions are like structured and like oriented.

12. A device according to claim 1, wherein the device is arranged at a focal plane of a thermal focusing means and mounted in a container for thermal stability purposes.

13. A method of testing a thermal imager including arranging the imager to receive radiation, said method comprising the steps of:

emitting radiation by first and second thermal emission regions which are both patterned to exhibit like spatial frequency;

providing a background surrounding said thermal emission regions and having a reference temperature against which reference temperature said thermal emission regions are viewed by said thermal imager; and adjusting the effective temperatures of the first and second thermal emission regions so that they are discernable with mutually opposite contrast relative to said reference temperature by said thermal imager.

14. A method according to claim 13 wherein in said radiation emitting step, further thermal emission regions are provided in addition to the first and second regions, and the effective temperatures of the further thermal emission regions have respective differentials relative to the effective temperature of the first thermal emission region.

15. A method according to claim 13 wherein said thermal emission regions are imaged simultaneously by said thermal imager.

16. A method according to claim 13, wherein in said radiation emitting step there is included the step of manually adjusting the effective temperature of the first thermal emission region and leaving the effective temperature of the second thermal emission region fixed relative to the effective temperature of the first thermal emission region.

17. A method according to claim 13, wherein in said radiation emitting step the effective temperature of each thermal emission region is independently adjustable.

18. A method according to claim 13, wherein the thermal emission regions are like structured and like oriented.

* * * * *